United States Patent
Yu et al.

(10) Patent No.: US 9,097,407 B2
(45) Date of Patent: Aug. 4, 2015

(54) SLIM BORDER DESIGN OF DISPLAY DEVICE AND BACKLIGHT MODULE THEREOF

(71) Applicant: AU Optronics Corporation, Hsin-Chu (TW)

(72) Inventors: Chiao-Kun Yu, Hsin-Chu (TW); Hung-Chih Chen, Hsin-Chu (TW); Chia-Hsiu Huang, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 289 days.

(21) Appl. No.: 13/794,286

(22) Filed: Mar. 11, 2013

(65) Prior Publication Data

US 2013/0301239 A1 Nov. 14, 2013

(30) Foreign Application Priority Data

May 8, 2012 (TW) .............................. 101116419 A

(51) Int. Cl.
*F21V 15/01* (2006.01)
*F21V 8/00* (2006.01)

(52) U.S. Cl.
CPC ............. *F21V 15/01* (2013.01); *G02B 6/009* (2013.01); *G02B 6/0088* (2013.01)

(58) Field of Classification Search
CPC ................ G02F 1/133608; G02F 1/133615; F21V 15/01; G02B 6/0081; G02B 6/0088; G02B 6/009
USPC ........................................ 362/632, 633, 97.1
See application file for complete search history.

(56) References Cited

U.S. PATENT DOCUMENTS

| 2007/0046859 A1 | 3/2007 | Huang et al. |
| 2011/0187634 A1 | 8/2011 | Kim et al. |
| 2012/0320629 A1 * | 12/2012 | Lim et al. ...................... 362/609 |

FOREIGN PATENT DOCUMENTS

| CN | 2769946 Y | 4/2006 |
| CN | 201207114 Y | 3/2009 |
| TW | I234102 | 6/2005 |
| TW | 200708839 A | 3/2007 |
| TW | 200905291 | 2/2009 |

(Continued)

OTHER PUBLICATIONS

China Office Action dated Feb. 25, 2014.
(Continued)

*Primary Examiner* — Thomas M Sember
(74) *Attorney, Agent, or Firm* — McClure, Qualey & Rodack, LLP

(57) ABSTRACT

A backlight module includes a bezel, a supporting frame, and a light source module. The bezel includes a back plate and a side wall connected to an edge of the back plate; the supporting frame includes a lower frame body and an upper frame body extending from a top of the lower frame body, wherein the lower frame body is disposed on the back plate and surrounded by the side wall. The upper frame body has at least a portion laterally shifted relative to the lower frame body to be located over the side wall. The light source module is surrounded by the lower frame body, wherein the portion of the upper frame body located over the side wall encloses a panel accommodation space above a top of the light source module. A display device includes the above-mentioned backlight module and a display panel disposed in the panel accommodation space.

16 Claims, 6 Drawing Sheets

(56) References Cited

FOREIGN PATENT DOCUMENTS

| | | |
|---|---|---|
| TW | 201020645 | 6/2010 |
| TW | 201104305 | 2/2011 |
| TW | 201120352 | 6/2011 |
| TW | I345097 | 7/2011 |
| TW | I345657 | 7/2011 |
| TW | I355529 | 1/2012 |

OTHER PUBLICATIONS

English translation of abstract of CN 201207114 Y (published Mar. 11, 2009).

China Office Action dated Oct. 11, 2014.

Taiwan Office Action dated Aug. 25, 2014.

\* cited by examiner

SLIM BORDER DESIGN OF DISPLAY DEVICE AND BACKLIGHT MODULE THEREOF

BACKGROUND OF THE INVENTION

1. Field of the Invention

The present invention generally relates to a display device and a backlight module thereof. Particularly, the present invention relates to a display device having slim border design and a backlight module thereof.

2. Description of the Prior Art

Backlight module has been extensively applied to various electronic products having display function, such as laptop, tablet, television, mobile phone, and other communication devices. Because of technology improvement in display industry and life demand, the electronic products having display function are becoming smaller, thinner, and/or lighter. For the purpose of smallness, thinness, and/or lightness, the outline and the interior components may require adjustments or improvements in order to have the same or even better efficiency under a limited volume or space.

As FIGS. 1A-1B show, the conventional backlight module includes a frame 8 consisting of a plastic frame 82 and a metal frame 81. The plastic frame 82 is for bearing a display panel 7, wherein a wall 820 of the plastic frame 82 surrounds the display panel 7. The metal frame 81 surrounds the plastic frame 82 to improve structural strength. For the purpose of producing a slimmer and lighter display device and enlarging the displaying area, it is known to reduce a thickness of the plastic frame 82, the wall 820, and/or metal frame 81 for making a frame border of the backlight module slimmer. However, the manufacturing method of the plastic frame 82 or the wall 820 limits an extent to which a thickness thereof is reduced; on the other hand, reducing the thickness of the metal frame 81 affects strength of the whole backlight module and/or display device 9. That is, always reducing the thickness of the plastic frame 82 or the wall 820 thereof and/or the metal frame 81 is not a proper way of designing the backlight module.

SUMMARY OF THE INVENTION

It is an object of the present invention to provide a display device having a slimmer border and a backlight module thereof.

It is another object of the present invention to provide a display device and a backlight module thereof, which provide the same or better display panel-supporting function with a frame having a slimmer border.

It is yet another object of the present invention to provide a display device and a backlight module thereof, in which cumulative effect of tolerance in the frame is reduced.

The backlight module of the present invention includes a bezel, a supporting frame, and a light source module. The bezel includes a back plate and a side wall connected to an edge of the back plate. The supporting frame includes an upper frame body and a lower frame body, wherein the lower frame body is disposed on the back plate and is surrounded by the side wall; the upper frame body extends from a top of the lower frame body and has at least a portion laterally shifted relative to the lower frame body to be located over the side wall. The light source module of the backlight module is disposed on the back plate and is surrounded by the lower frame body and the side wall, wherein the portion of the upper frame body over the side wall encloses a panel accommodation space above a top of the light source module.

The display device of the present invention includes the backlight module and a display panel, wherein the backlight module includes the bezel, the supporting frame, and the light source module. As mentioned above, the bezel includes the back plate and the side wall; the supporting frame includes the upper frame body and the lower frame body, wherein the lower frame body is disposed on the back plate and is surrounded by the side wall; the upper frame body extends from a top of the lower frame body and has at least a portion laterally shifted relative to the lower frame body to be located over the side wall. The light source module is surrounded by the lower frame body and the side wall, wherein the portion of the upper frame body over the side wall encloses the panel accommodation space above the top of the light source module. The display panel is disposed in the panel accommodation space.

DETAILED DESCRIPTION OF THE PREFERRED EMBODIMENT

Figure 1A:
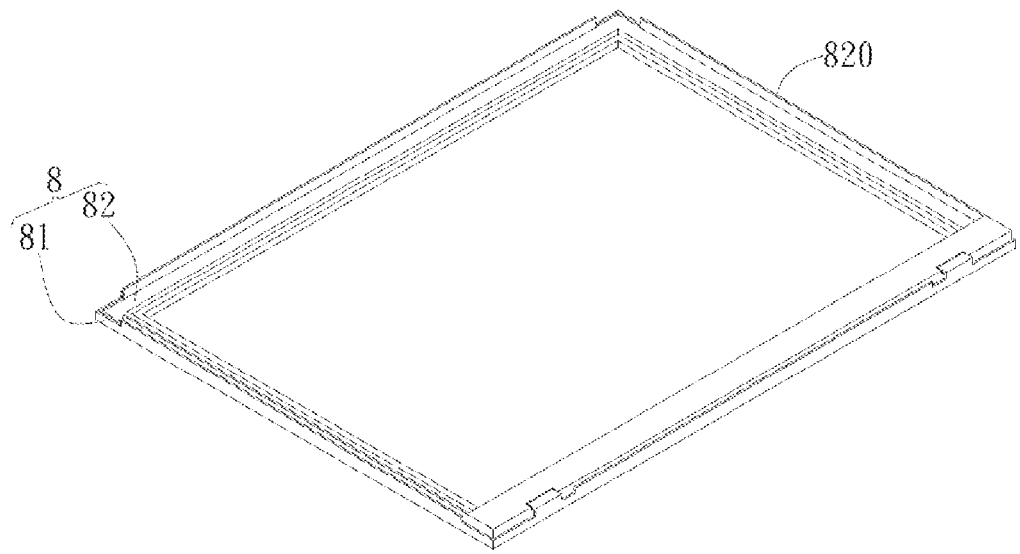
FIGS. 1A-1B show schematic views of the conventional display module.
Figure 1B:
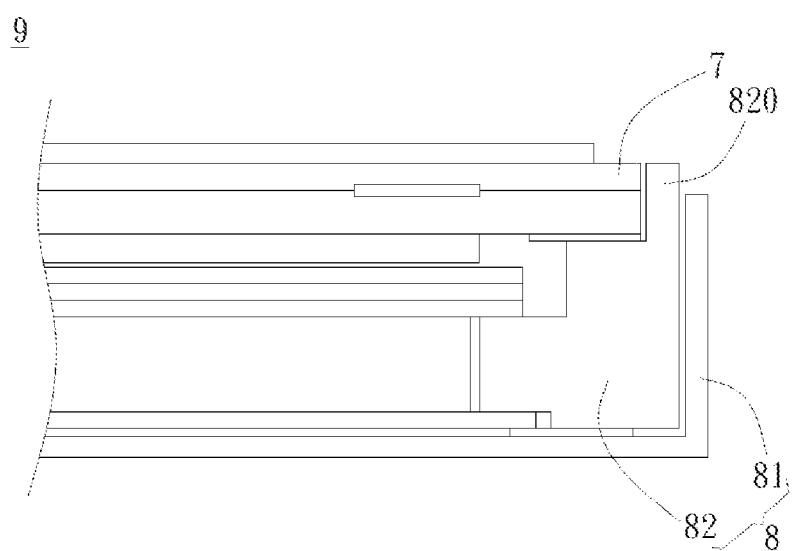
Figure 2:
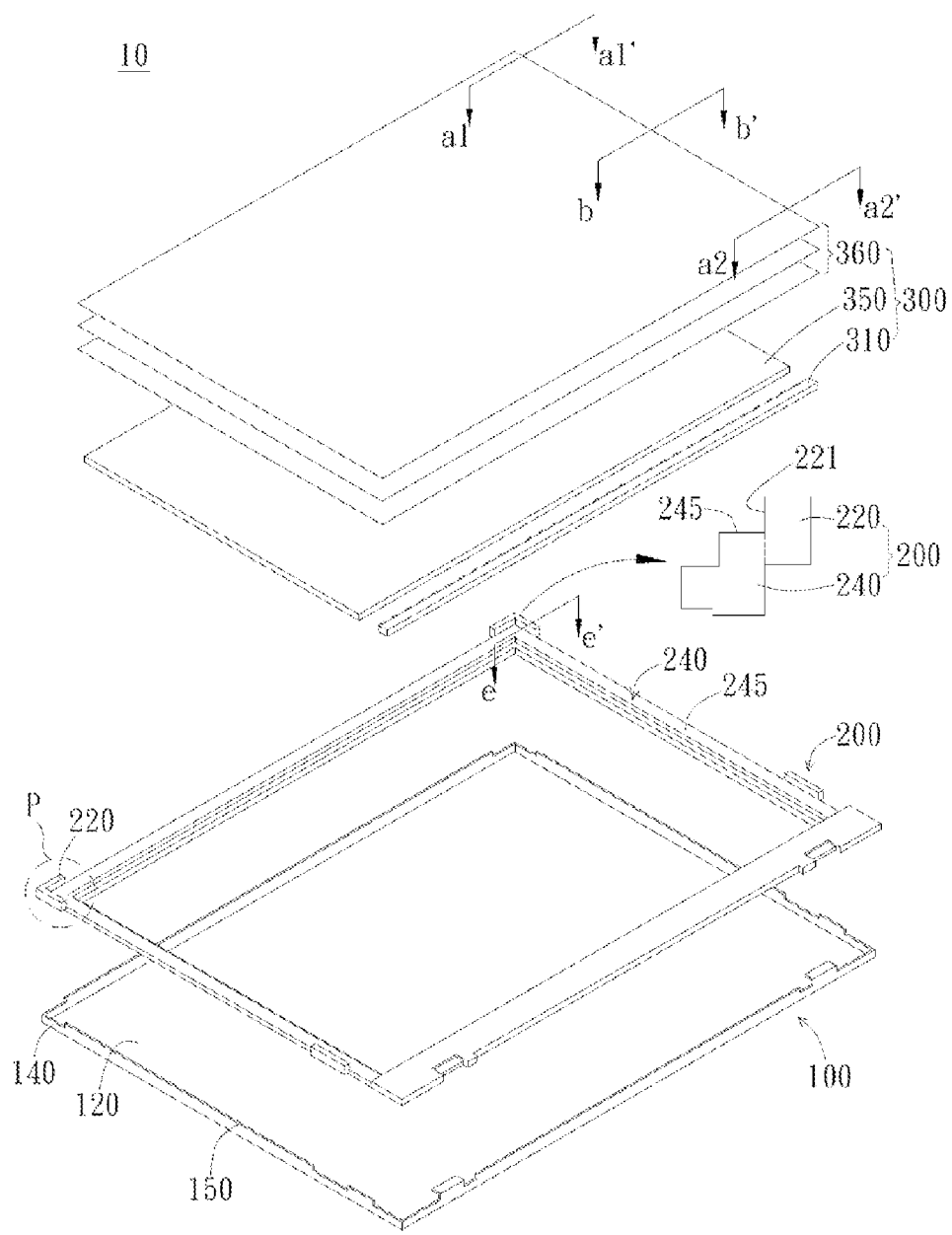
FIG. 2 is an exploded view of the embodiment of the backlight module of the present invention.

In the embodiment as shown in FIG. 2, the backlight module 10 of the present invention includes a bezel 100, a supporting frame 200, and a light source module 300. The combination of the bezel 100 and the supporting frame 200 may be used in assembling the light source module 300 and further accommodating a display panel (as described later). The bezel 100 has a back plate 120 and a side wall 140, wherein the back plate 120 preferably has a rectangular shape. The side wall 140 surrounds the back plate 120 and is connected to an edge of the back plate 120, wherein the side wall 140 substantially extends upright away form the back plate 120. In addition, the bezel 100 further includes a plurality of extending walls 150 respectively extending from a top of the side wall 140. Preferably, the extending walls 150 substantially extend upright. The extending walls 150 are spaced at intervals so as to display a battlements-like appearance together with the side wall 140. Specifically, positions on the side wall 140 for forming/disposing the extending walls 150 are preferably (pre)determined in cooperation with a pattern of the supporting frame 200 (as described later). In the preferred embodiment of the present invention, at least one of the extending walls 150 is not formed on the corner of the bezel 100, as shown in FIG. 2, wherein the side walls 140, which are respectively connected to adjacent sides of the back plate 120, may together constitute a right angle at the corner or a chamfered angle having a curved face such as an arc face. In the embodiment that the extending walls 150 are formed in at least a portion of the bezel 100 other than a corner, between the adjacent corners, for example, there may be a single extending wall 150 or a plurality of extending walls 150 spaced at intervals. The length of the extending wall 150 along the side wall 140 or the size of an interval between the adjacent extending walls 150 is preferably (pre)determined in cooperation with the pattern of the supporting frame 200 (as described later).

As FIG. 2 shows, the supporting frame 200 includes an upper frame body 220 and a lower frame body 240. The upper frame body 220 at least partially extends from a top of the lower frame body 240. Specifically, the upper frame body 220 may extend outwards or upwards from a top face 245 of an upper portion of the lower frame body 240. Alternatively, the upper frame body 220 may extend outwards or upwards from a lateral rim of the lower frame body 240. In the preferred embodiment of the present invention, as a cross-sectional view of the supporting frame 200 along an e-e' section line (indicated by the arrow) shows, the upper frame body 220 (on the right side of the dotted line) extends laterally outwards from a lateral rim of the upper portion of the lower frame body 240 (on the left side of the dotted line) and generally parallel to a plane on which the supporting frame 200 lies, wherein an inner side of a lower portion of the upper frame body 220 is preferably connected to an outer side of the upper portion of the lower frame body 240. On the other hand, a pattern of the upper frame body 220 is preferably designed in cooperation with the above-mentioned position and length of the extending walls 150 or the size of the interval of the adjacent extending walls 150 (as described later).

With regard to the pattern of the upper frame body 220, in the preferred embodiment, the upper frame body 220 is at least partially formed on a corner of the supporting frame 200, as shown in FIG. 2. Furthermore, in the embodiment of the present invention that the side walls 140 constitute the right angle at the corner, a portion of the upper frame body 220 on the corner extending along the lateral rims of adjacent sides of the lower frame body 240 is L-shaped. In other embodiments, the portion of the upper frame body 240 on the corner of the supporting frame 200 may be arc-shaped. In addition to the corners of the supporting frame 200, the upper frame body 220 may at least partially formed on the sides of the supporting frame 200. As shown in FIG. 2, the upper frame body 220 is formed on the opposite sides of the supporting frame 200 and distributed along the lateral rims of the sides in a straight line.

The bezel 100 mentioned above may be assembled with the supporting frame 200 to form a combined frame of the backlight module 10, wherein stiffness of the bezel 100 is greater than that of the supporting frame 200. For example, material of the bezel 100 could be metal while material of the supporting frame 200 could be plastic. Alternatively, both the bezel 100 and the supporting frame 200 may be metal, plastic, or other composite materials and preferably have different stiffness. As the combined frame shown in FIG. 3, the lower frame body 240 of the supporting frame 200 is disposed on the back plate 120 and surrounded by the side walls 140, wherein the lower frame body 240 encloses a region in the bezel 100 for accommodating other components of the backlight module 10, such as a light source module. On the other hand, the upper frame body 220 connected to the top of the lower frame body 240 is located opposite to the back plate 120. In the preferred embodiment of the present invention, the upper frame body 220 has at least a portion shifted outwards laterally (i.e. in a direction substantially parallel to the back plate 120) relative to the lower frame body 240. A position of the upper frame body 220 on a z axis is higher than the side wall 140, i.e. the upper frame body 220 is located over the side wall 140, wherein an extent to which the upper frame body 220 is shifted outwards laterally is preferably greater than or equal to a thickness of the side wall 140 and/or that of the extending walls 150. In other words, a thickness of the portion of the upper frame body 110 located over the side wall 140 is preferably greater than or equal to the thickness of the side wall 140 and/or that of the extending walls 150, wherein the portion of the upper frame body 110 protrudes out of the side wall 140. In addition, no part of the bezel 100 is located outside the portion of the upper frame body 220 that is located over the side wall 140. In other words, with regard to the combined frame having the upper frame body 220, the portion of the upper frame body 220 located over the side wall 140 is preferably the outmost part of the combined frame in the embodiment.

In the preferred embodiment of the present invention, since the upper frame body 220 is at least partially formed on the corner of the supporting frame 200 and has an L-shaped distribution with respect to a virtual plane parallel to the back plate 120, and the extending wall 150 is preferably not formed on the corner of the bezel 100, the upper frame body 220 and the extending walls 150 are distributed alternatively. Accordingly, for example, a configuration that the portion of the upper frame body 220 on the corner has adjacent extending walls 150 located and separated on two ends thereof can be constructed, wherein the adjacent extending walls 150 are located on adjacent sides of the back plate 120. In other words, the portion of the upper frame body 220 located over the side wall 140 is located between the adjacent extending walls 150. In addition, the upper frame body 220 formed on any side of the supporting frame 200 and extending in a straight line also preferably has adjacent extending walls 150 located and separated on two ends thereof, wherein these extending walls 150 are spaced at interval and formed on one side of the bezel 100. The size of the interval of the adjacent walls 150 is preferably greater than or equal to the length of the portion of the upper frame body 220 that is located over the side wall 140 and extends along the side.

Figure 3:
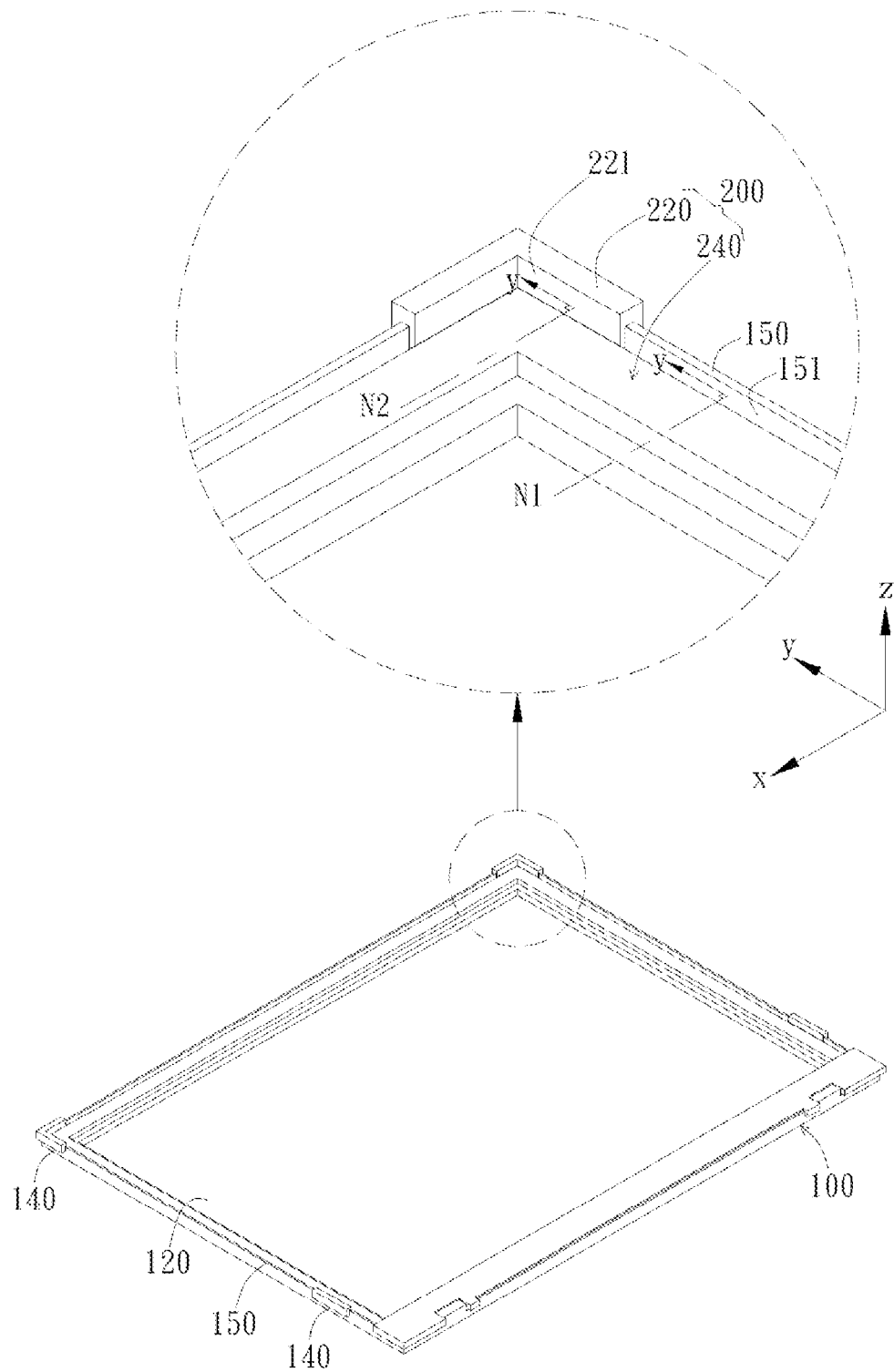
FIG. 3 is a schematic view of the embodiment of the frame of the present invention.

Collectively speaking, an upper portion of the combined frame composed of the bezel 100 and the supporting frame 200 has a pattern of alternatively distributed extending walls 150 and upper frame body 220. In addition, as shown in FIG. 3, an inner face 221 of the upper frame body 220 located over the side wall 140 is generally flush with an inner face 151 of the extending walls 150; however, a difference is allowable, wherein it is preferred that the inner face 151 is pushed outward with respect to the inner face 221.

Figure 4A:
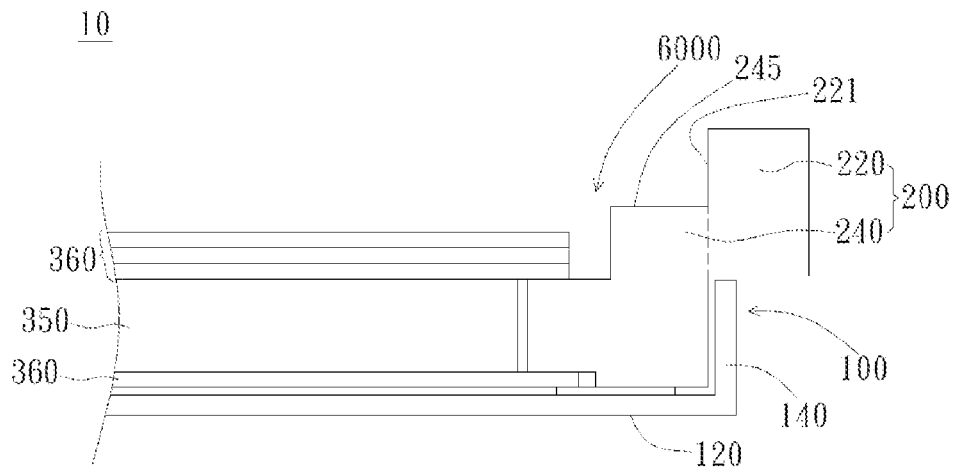
FIG. 4A shows a cross-sectional view of the embodiment of the backlight module of the present invention.
Figure 4B:
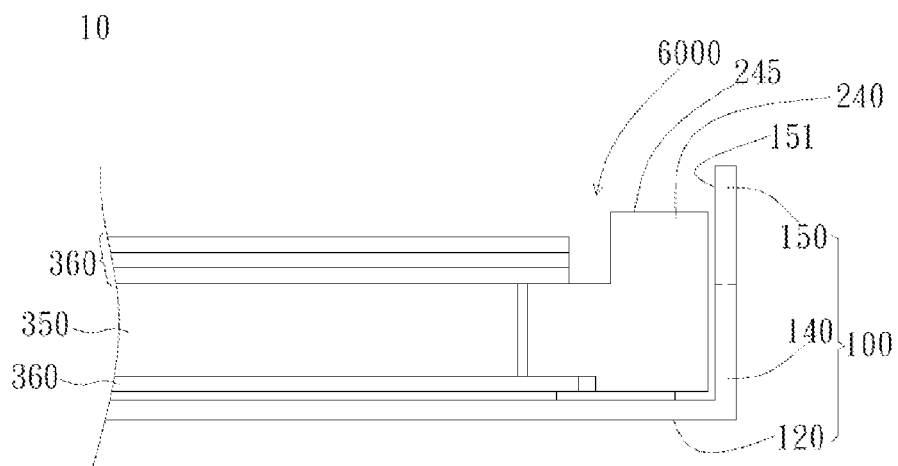
FIG. 4B shows another cross-sectional view of the embodiment of the backlight module of the present invention.

As FIG. 2 and FIGS. 4A-4B show, the backlight module 10 of the present invention also includes the light source module 300. The light source module 300 can include, for example but not limited to, a light source 310, a light guide plate 350, and at least one optical film 360, such as prism, diffuser, or combined optical film. Generally, the light source module 300, the supporting frame 200, and the bezel 100 are preferably assembled into the backlight module 10 in accordance with the exploded view shown in FIG. 2, which demonstrates relative location of the components. As shown in FIG. 4A, a cross-sectional view along a section line a1-a1' or a2-a2' in FIG. 2 is illustrated in detail, wherein the section line a1-a1' or a2-a2' passes the upper frame body 220; the light source module 300 is disposed on the back plate 120 and is in the region of the bezel 100 enclosed by the lower frame body 240 so as to be surrounded by the lower frame body 240 and the side wall 140. In addition, as FIG. 4A shows, the portion of the upper frame body 220 located over the side wall 140 encloses a panel accommodation space 6000 above a top of the light source module 300 for accommodating such as a display panel (as described later), wherein the top face of the upper portion of the lower frame body 240 is preferably higher than the top of the light source module 300. Further speaking, the top face 245 of the upper portion of the lower frame body 240 preferably serves as a portion of a bottom of the panel accommodation space 6000.

Please further refer to FIG. 4B; a cross-sectional view along a section line b-b' is illustrated in detail, wherein the section line b-b' passes the extending wall 150 of bezel 100 rather than the upper frame body 220. In the present embodiment, the extending wall 150 preferably extends from the top of the side wall 140 and beyond the lower frame body 240 and is higher than the lower frame body 240 by a proper length. In addition, the extending wall 150 may further extend to be approximately equal to or higher than the upper frame body 220. However, the extending walls 150 are preferably slightly lower than the upper frame body 220 so that influence on displaying effect of the display panel disposed in the panel accommodation space will be reduced or avoided. As shown in FIG. 4B, the extending wall 150 extends above the top face 245 of the upper portion of the lower frame body 240. As a result, in addition to the upper frame body 220 distributed around the above-mentioned panel accommodation space 6000, the extending walls 150 of the bezel 100 is preferably distributed around the panel accommodation space 6000, too. In other words, the inner face 221 of the upper frame body 220 together with the inner face 151 of the extending walls 150 further encloses the panel accommodation space 6000.

As stated above, the upper portion of the combined frame has the pattern that the extending walls 150 and the upper frame body 220 are alternatively distributed and enclose the panel accommodation space 6000, wherein the extending walls 150 extend above the top face 245 of the lower frame body 240. In other words, as FIGS. 3-4B show, the portion of the extending walls 150 of the bezel 100 extending beyond the upper portion of the lower frame body 240 and the supporting frame 200 do not overlap in a direction parallel to a normal line N1 of the inner face 151. Moreover, the portion of the upper frame body 220 located over the side wall 140, and the bezel 100 do not overlap in a direction parallel to a normal line N2 of the inner face 221 of the upper frame body 220. That is, an upper portion of the combined frame higher than the light source module 300 has no overlapping arrangement of the supporting frame 200 and the bezel 100 so that cumulative effect of tolerance in the combined frame could be reduced; the thickness thereof could be lessened and therefore the border of the combined frame is slimmer.

Figure 5:
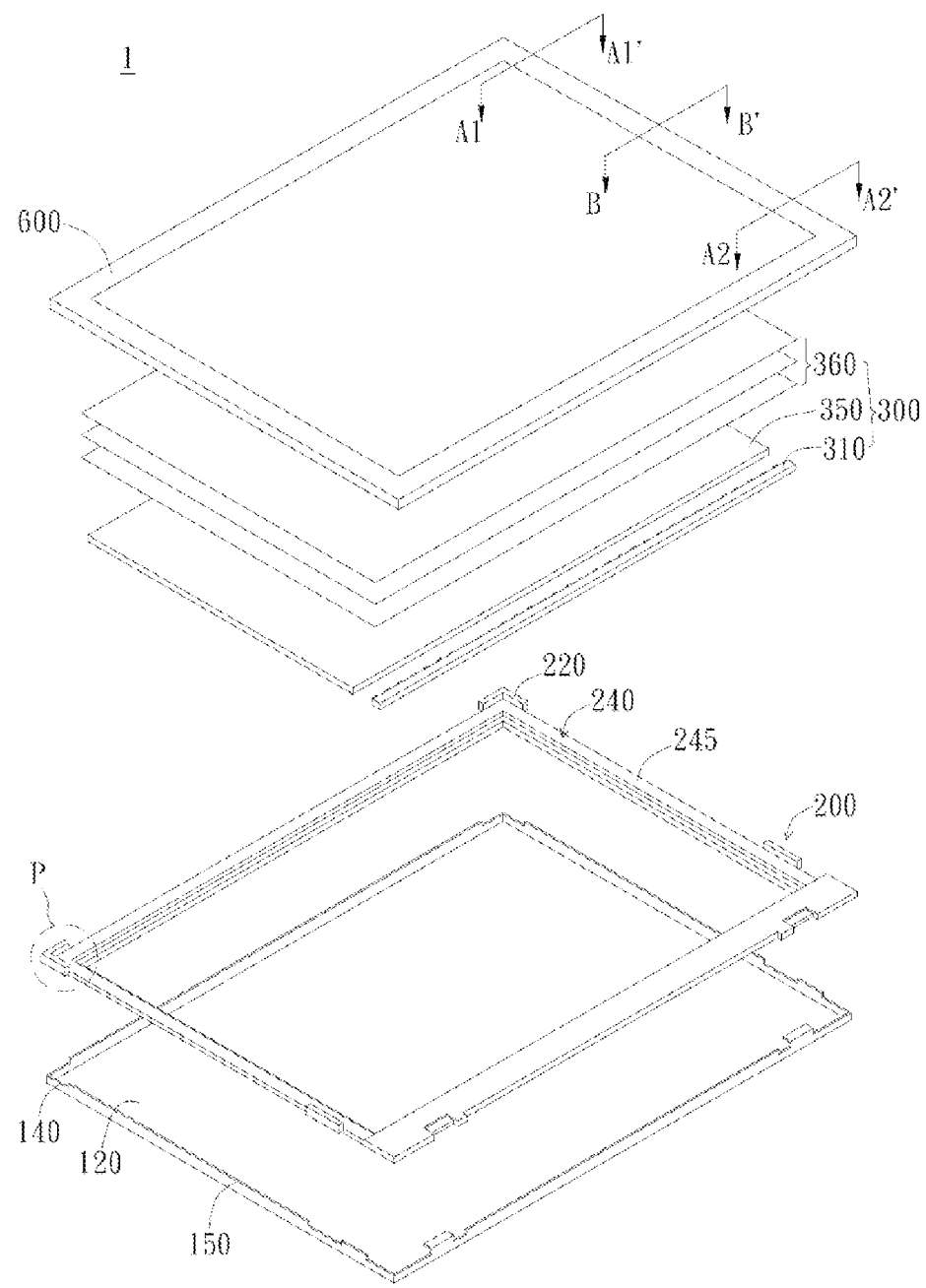
FIG. 5 is an exploded view of the embodiment of the display device of the present invention.
Figure 6A:
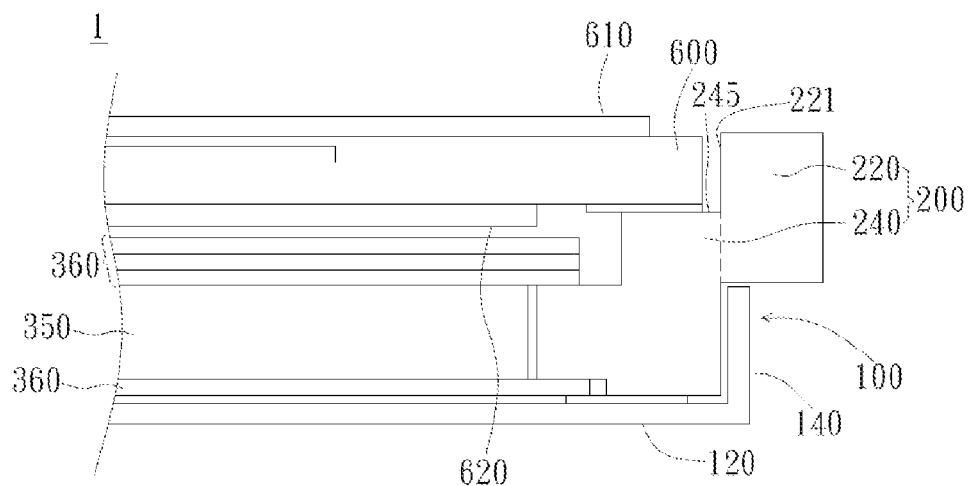
FIG. 6A shows a cross-sectional view of the embodiment of the display device of the present invention.
Figure 6B:
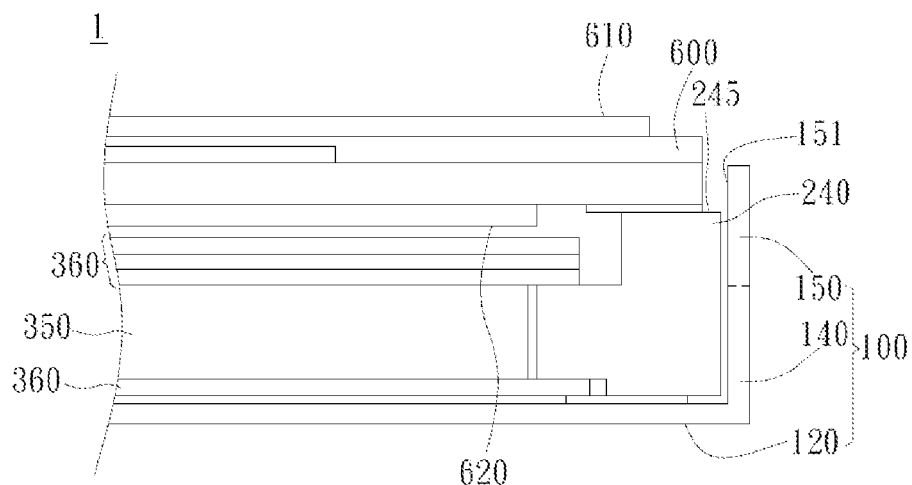
FIG. 6B shows another cross-sectional view of the embodiment of the display module of the present invention.

As FIG. 5 and its cross-sectional view, FIGS. 6A-6B show, the display device 1 of the present invention includes the above-mentioned backlight module 10 and a display panel 600. The display panel 600 is preferably rectangular and has a displaying face 610 and a bottom 620 opposite to the displaying face 610. As FIGS. 4A-4B and 6A-6B show, the display panel 600 is disposed in the panel accommodation space 6000 enclosed by the inner face 221 of the upper frame body 220 and the inner face 151 of the extending walls 150, wherein the lower frame body 240 supports the bottom 620 of the display panel 600 by the top face 245. In addition, the top of the light source module 300 is farther away from the display panel 600 than the top face 245 of the lower frame body 240 is. Therefore, a gap exits between the light source module 300 and the display panel 600.

In sum, the display panel 600 is preferably supported by the supporting frame 200 of the backlight module 10 to be above the light source module 300. Further speaking, it is the lower frame body 240 of the supporting frame 200 supporting the bottom 620 of the display panel 600. At least one corner of the display panel 600 is surrounded by the upper frame body 220, but not limited thereto. In addition to the corner P, the supporting frame 200 preferably includes a portion of the upper frame body 220 formed on another location, which is aside the display panel 600 to assist in protecting the display panel 600. In the other hand, since the portion of the upper frame body 220 located over the side wall 140 and the extending walls 150 together enclose the panel accommodation space 6000 and the extending walls 150 are higher than the lower frame body 240 by a proper length, the extending walls 150 could assist in protecting the display panel 600 at a position where the upper frame body 220 is not distributed (e.g. a position between the adjacent portions of the upper frame body 220), wherein the supporting frame 200 does not exit between the extending walls 150 and the display panel 600.

Since the supporting frame 200 is disposed on the back plate 120 and directly supports the display panel 600, the supporting frame 200 provides the display panel 600 with direct protection and buffer while the bezel 100 bears and protects the supporting frame 200, the backlight module 10, and the display panel 600. As a result, it is preferred that the bezel 100 has higher stiffness in comparison to the supporting frame 200 in order to endue the combined frame and/or the display device 1 strength. In the preferred embodiment of the present invention, the bezel 100 includes the back plate 120, the side wall 140, and the extending walls 150, wherein the position, the length of the extending walls 150 or the size of the interval between the adjacent extending walls 150 is preferably (pre)determined in cooperation with the upper frame body 220 of the supporting frame 200 so that the pattern that the extending walls 150 and the upper frame body 220 are alternatively distributed in the upper portion of the combined frame is configured and therefore, the border of the combined frame is slim. In ways of such design, at least one corner of the top portion of the combined frame could be a portion of the upper frame body 220, instead of the extending walls 150, without reducing strength of the combined frame and/or the display device 1, providing the display panel 600 with protection and buffer. In addition, since the extending walls 150 and the upper frame body 220 are alternatively distributed and fitted together, structure stability of the combination of the bezel 100 and the supporting frame 200 is enhanced and strength of the whole structure is improved.

Although the preferred embodiments of present invention have been described herein, the above description is merely illustrative. The preferred embodiments disclosed will not limit the scope of the present invention. Further modification of the invention herein disclosed will occur to those skilled in the respective arts and all such modifications are deemed to be within the scope of the invention as defined by the appended claims.

What is claimed is:

1. A backlight module, comprising:
a bezel including a back plate and a side wall connected to an edge of the back plate, wherein the bezel includes a plurality of extending walls extending from a top of the side wall, respectively, and adjacent extending walls are spaced with an interval;
a supporting frame including a lower frame body and an upper frame body extending from a top of the lower frame body, wherein the lower frame body is disposed on the back plate and surrounded by the side wall, the upper frame body has at least a portion shifted outwards laterally relative to the lower frame body to be located over the side wall, and the portion of the upper frame body located over the side wall is located between the adjacent extending walls; and a light source module surrounded by the lower frame body and the side wall, wherein the portion of the upper frame body located over the side wall encloses a panel accommodation space above a top of the light source module for accommodating a panel.

2. The backlight module of claim 1, wherein an inner side of a lower portion of the upper frame body is connected to an outer side of an upper portion of the lower frame body, and the upper portion of the lower frame body has a top face to be a portion of a bottom of the panel accommodation space.

3. The backlight module of claim 2, wherein the top face of the upper portion of the lower frame body is higher than the top of the light source module.

4. The backlight module of Claim 1, wherein an inner face of the upper frame body and an inner face of the extending walls together constitute a border of the panel accommodation space.

5. The backlight module of claim 4, wherein the inner face of the upper frame body is flush with the inner face of the extending walls.

6. The backlight module of Claim 1, wherein the upper frame body is formed on a corner of the supporting frame and is L-shaped with respect to a virtual plane parallel to the back plate, the adjacent extending walls are located respectively on adjacent sides of the bezel and on two ends of the upper frame body.

7. The backlight module of Claim 1, wherein a portion of the extending walls further extends beyond an upper portion of the lower frame body, the portion of the extending walls extending beyond the upper portion of the lower frame body and the supporting frame do not overlap in a direction parallel to a normal line of an inner face of the extending walls.

8. The backlight module of claim 1, wherein the portion of the upper frame body located over the side wall and the bezel do not overlap in a direction parallel to a normal line of an inner face of the upper frame body.

9. A display device, including:
a backlight module, comprising:
a bezel including a back plate and a side wall connected to an edge of the back plate, wherein the bezel includes a plurality of extending walls extending from a top of the side wall, respectively, and adjacent extending walls are spaced with an interval;
a supporting frame including a lower frame body and an upper frame body extending from a top of the lower frame body, wherein the lower frame body is disposed on the back plate and surrounded by the side wall, the upper frame body has at least a portion shifted outwards laterally relative to the lower frame body to be located over the side wall, and the portion of the upper frame body located over the side wall is located between the adjacent extending walls; and
a light source module surrounded by the lower frame body and the side wall, wherein the portion of the upper frame body located over the side wall encloses a panel accommodation space above a top of the light source module; and
a display panel disposed in the panel accommodation space.

10. The display device of claim 9, wherein an inner side of a lower portion of the upper frame body is connected to an outer side of an upper portion of the lower frame body, and the upper portion of the lower frame body has a top face to be a portion of a bottom of the panel accommodation space and to support a bottom of the display panel.

11. The display device of claim 10, wherein the top face of the upper portion of the lower frame body is closer to the display panel than the top of the light source module is.

12. The display device of claim 9, wherein an inner face of the upper frame body and an inner face of the extending walls together constitute a border of the panel accommodation space.

13. The display device of claim 12, wherein the inner face of the upper frame body is flush with the inner face of the extending walls.

14. The display device of claim 9, wherein the upper frame body is formed on a corner of the supporting frame and is L-shaped with respect to a virtual plane parallel to the back plate, the adjacent extending walls are located respectively on the adjacent sides of the bezel and on two ends of the upper frame body.

15. The display device of claim 9, wherein the supporting frame is not located between the extending wall and the display panel.

16. The display device of claim 9, wherein the bezel is not located outside the portion of the upper frame body located over the side wall.

* * * * *